United States Patent Office 3,275,505
Patented Sept. 27, 1966

3,275,505
PROCESS FOR PREPARING A BIOCIDAL COMPOSITION COMPRISING HALOGENATED LEVULINIC ACID
Robert J. Herschler, Camas, Wash., assignor to Crown Zellerbach Corporation, San Francisco, Calif., a corporation of Nevada
No Drawing. Filed Nov. 23, 1964, Ser. No. 413,357
6 Claims. (Cl. 167—22)

This is a continuation-in-part of my copending application Serial No. 135,709, filed August 24, 1961, now abandoned.

The basic starting material in preparing the compounds employed in the invention comprising part of the subject matter of my application Serial No. 135,709, is levulinic acid. Levulinic acid is produced commercially from hexose-yielding materials. Generally, this process comprises the hydrolysis with mineral acid catalyst of carbohydrates, particularly cellulosic materials.

Ordinarily, the hydrolysis is carried out at an elevated temperature inasmuch as the rate of reaction is too slow at room temperature. However, consistent with a realistic speed of reaction, the process is tailored to minimize the production of degradation products or by-products, such as angelica lactones which lower the yield of levulinic acid and which create purification or isolation problems (see U.S. Patent No. 2,780,588). Inevitably, however, lactones and other undesirable by-products are obtained in appreciable quantities. Since lactones and other soluble impurities discolor the product and also tend to polymerize, elaborate processes to remove them from the levulinic acid product are employed in order to purify the levulinic acid.

However, I have found that, far from being detrimental for the purpose of producing a halogenated levulinic acid based material for controlling microorganisms, the crude hydrolysate product with these soluble contaminants, when subject to halogenation, produce a halogenated product having an unusually broad spectrum of biocidal activity. When compared, for example, with relatively pure halogenated levulinic acids, the product from halogenation of crude or contaminated material derived from hydrolysis of hexose sources, will reduce by as much as 20% the biocide requirements for microorganism control. They are found to be particularly beneficial in recirculating water systems, such as paper mill white water systems.

It is therefore the object of this invention to provide halogenated levulinic acid based compositions of increased biocidal activity and methods of preparing and using these compositions.

It is believed that the additional biocidal activity is due, at least in part, from the lactones which are halogenated with the levulinic acid as well as other presently unidentifiable contaminants which have become halogenated.

As the desirable by-products are produced through catalyzed hydrolysis reaction on all hexose sources, any such carbohydrate sources may be used in a production of the crude levulinic acid product for direct halogenation, for example, cellulose, dextrose, starch, molasses, dextrin, etc. Cellulosic materials, such as bagasse, bamboo, soft wood, sawdust, wastepaper, corncob, and straw are preferred. The conditions of hydrolysis may be any of those of the prior art such as described in U.S. Patents Nos. 2,382,572, 2,305,738, 2,738,367, 2,840,605, and 2,917,537. The catalyst is preferably a strong acid, such as hydrochloric acid, sulphuric acid, phosphoric acid, paratoluenesulfonic acid, and hydrobromic acid. Acidic ion exchange resins may also be utilized in accordance with U.S. Patent No. 2,738,367.

The reaction may be carried out in a batch or continuous process, an aqueous solution of the catalyst being added to the hexose-containing material which is generally ground or comminuted to a finally divided state (if it is not already in such a state) in order to permit a more rapid reaction.

The aqueous solution of catalyst may be preheated to between 80° C.–110° C. in order to decrease the reaction time after it has been added to the hexose-containing material. The ratio between the acid catalyst and the hexose-containing material in the reaction zone should be at least 1 part by weight of the acid to 100 parts by weight of the hexose-containing material. Preferably 5 to 30 parts catalyst to 100 parts hexose-containing material is maintained. The acid catalyst concentration in the reaction zone should be at least 0.5%, preferably from 1% to 5% by weight, based on the liquid portion of the reaction mass. The acid concentration may be varied depending on the type of hexose-containing material used and on the desired rate of reaction. The reaction time ranges between 1 second and 3 hours depending on the other process variables, the reaction time being inversely proportional to the temperature and the acid catalyst concentration.

To start the reaction, heat is supplied to the reaction zone. The reaction being exothermic, once started it produces sufficient heat for the duration of the reaction. The reaction is preferably carried out at 100° C. to 250° C., preferably between 170° C. and 210° C. under autogenous pressure. After the reaction is complete, the temperature of the reacted mass may be reduced to about 90° C. to 120° C. The exothermic heat created in the reaction zone causes generation of vapors which include steam and a portion of the catalyst (if the catalyst is volatile). These vapors may be vented and recovered for reuse.

The reacted mixture includes levulinic acid, catalyst, insoluble tars and humins, lactones, formic acid, and unidentifiable, nonvolatile dissolved materials in minor quantities. The reacted mass may be filtered to remove the insoluble tars and humins and the filtrate collected. Since a large portion of levulinic acid, lactones, and other nonvolatile soluble materials are retained in the residue, the residue is washed with water before discarding and the washings added to the filtrate liquor.

The hydrolysate liquor thus collected then may be concentrated by evaporation. The evaporation is preferably conducted at a reduced pressure to maintain the liquor at a moderate temperature, thereby preventing excessive degradation of the levulinic acid. Preferably a vacuum of between 30–70 mm. of mercury absolute pressure is maintained, but the vacuum can be applied as low as 5 to 6 mm. of mercury. Formic acid and the remaining acid catalyst is also stripped off with the water. Evaporation may be continued until the liquor is concentrated to a dark, low viscosity material which boils in the range of 240° C. to 250° C. at 760 mm. of mercury pressure. The extent of concentration is not critical, but, the more concentrated the liquor, the more rapid is the halogenation reaction and the more concentrated is the resulting biocidal product.

The above merely describes an important prior art technique of preparing crude levulinic acid liquor. Other prior art methods of hydrolyzing hexose sources may be used; also, other known techniques of removing the insoluble materials, catalyst and volatile constituents from the reaction product. Where a nonvolatile catalyst is used, the catalyst may be separated from the process liquor by contacting the liquor with an extractive solvent which removes the crude levulinic acid product, including a major portion of the other soluble high boiling constituents, to the substantial exclusion of the catalyst and a substantial portion of the water which forms the raffinate. The solvent and any remaining formic acid can then be separated by fractionation to isolate the concentrated crude material for halogenation. This procedure is not preferred, however, because a portion of the desirable lactones and other high boiling, water soluble materials are often in the raffinate. U.S. Patents Nos. 2,840,605, 2,684,981 and 2,684,982, are to be noted with regard to concentrating crude levulinic acid by solvent extraction.

The conditions of reaction may be adjusted to increase the yield of lactones. Desirably, at least 3-5% of lactones (based upon levulinic acid plus lactones=100%) are obtained. The lactones may be increased by increasing the temperature of reaction by mild heating or by increasing the temperature of the distillation or simply by moderate heating of the crude product.

The concentrated liquor may then be directly halogenated with bromine or chlorine as by introducing the halogen gas into the liquor by means of a gas diffusion tube. The rate of gas introduction is not critical but, desirably, it is slow enough so that the heat of reaction may be dissipated to some degree to avoid high temperature side reactions. The reaction temperature is desirably controlled within a range of 100° C. to 125° C. Since the reaction is exothermic, usually no heating is required except that necessary to initiate reaction.

Alternatively, halogenation may be carried out with the unconcentrated liquor. This is not preferred, however, since a two-phase system will result (water phase and halogenated product phase) with the attendent problems of separation or homogenization by addition of dispersants or emulsifiers.

The degree of halogenation of the crude material is not critical. It is possible to halogenate as high as 56% by weight (based on solids) in the case of chlorine and as high as 73% by weight in the case of bromine. The higher the halogenation level, the more biocidal activity is obtained. A chlorination level of 40-49% and a bromination level of 60-65% is preferred for the sake of economy and time consumption in the halogenation process. Obviously, any lesser degree of halogenation is possible simply by stopping halogen addition at an intermediate point, but at least 22% chlorine addition, or 40% of bromine addition is desirable to obtain reasonable biocidal activity.

The compositions thus formed are very effective as slimicides for water systems, particularly in paper mill white water systems which are rich in slime nutrients, when dispersed therein. Usually good control is obtained by applying the compositions in concentrations of 5-200 p.p.m. of the composition. As low as around 0.5 p.p.m. may be adequate but, in some instances as high as 400 p.p.m. may be desirable.

Desirably the compositions are first combined with a dispersant before they are added to the water system. For immediate use, an aliphatic primary alcohol, particularly a lower alkyl alcohol such as ethyl alcohol may be used. However, the alcohol-halogenated crude levulinic acid product should be used promptly because it has a short shelf-life. I find that 5-20% of the composition in alcohol gives a very satisfactory dispersion. Dimethyl sulfoxide (for example, a 50% solution) may also be used to provide a reasonable dispersion where economy is not a critical factor. For a unique and advantageous dispersing system employing a lignin sulfonic acid salt and dimethyl sulfoxide, which may be employed for the present compositions, see my copending application Serial No. 413,364, filed November 23, 1964.

The following examples are to further illustrate (but not limit) my invention:

*Example 1*

This example demonstrates preparation of a halogenated composition from a variety of carbohydrate sources. As raw materials, the following were used (all running in the range of 50% cellulose content by weight): ground bagasse, bamboo, Douglas fir sawdust, corncob, and wheat straw.

A laboratory digester was charged with 420 grams of carbohydrate source, 28 grams of hydrochloric acid and 2,000 grams of water. The digester was heated and agitated under a pressure sufficient to hold the temperature to 190° C. The temperature in the digester was raised rapidly to the cooking temperature and held at this temperature with agitation for 30 minutes. The digester was then cooled and vented to strip off a portion of the HCl. The product was filtered and the filter cake washed with 2,000 grams of water. The filtrate and water washings were combined and the liquor thus formed was concentrated by evaporation under a vacuum of 10 mm. of mercury. When the temperature of the distillate coming over (at the reduced pressure) reached 25° C., evaporation was halted. This material has a concentration of 95% levulinic acid, 3% lactones and 2% unidentified soluble, nonvolatile materials.

The resulting concentrated liquor (a dark product of high viscosity) was then halogenated in three stages by slow addition of chlorine gas through a gas diffusion tube. The final addition producing an exotherm bringing the temperature to 120°-125° C. HCl was stripped from the resulting viscous coil by heating under vacuum for a short period of time. The product was then diluted in alcohol by addition of an equal volume of ethanol and the resulting composition introduced into a 100% ground wood pulp slurry of 0.3% consistency, in a beaker constantly stirred during the test and held at 25° C. The addition in each instance is sufficient to bring the concentration in the pulp slurry to 100 parts per million of the product. Organism counts were made at the time of addition, one hour later and 24 hours after the time of addition. The results are as follows:

HALOGENATED, HYDROLYZED HEXOSE-SOURCE BIOCIDES SLIMICIDE SCREEN

| Raw Material Source | Chlorine Content, Percent/wt. | Activity at 100 p.p.m. Organism Count per ml.[1] | | |
|---|---|---|---|---|
| | | 0 | 1 hr. | 24 hrs. |
| Bagasse | 44.7 | >100,000 | 18,000 | 0 |
| Bamboo | 45.1 | >100,000 | 22,000 | 0 |
| Soft wood (Douglas fir) | 46.1 | >100,000 | 7,000 | 0 |
| Corncob | 45.8 | >100,000 | 30 | 0 |
| Straw | 44.0 | >100,000 | 600 | 0 |

[1] Organism count at 1 hr.-24 hrs. means time from contact with biocide until aliquot withdrawn and plated using Sabourouds Dextrose agar. Plates incubated at 30° C. for 24, then counted.

*Example 2*

As an example of a higher halogenation level, the crude levulinic acid liquor of Example 1 as produced from wheat straw was halogenated with chlorine by slow sustained addition of chlorine gas in a gas diffusion tube until the chlorine lever reached 53.7% combined chlorine (based upon total weight of the product). A trace of iodine (amounting to about 0.005% of the liquor) was added to the liquor as a catalyst prior to halogenation.

The resulting material was used to treat a pulp slurry as in Example 1 and similar but somewhat lower organism counts were obtained after 1 hour.

*Example 3*

Ten pounds of the concentrated product of Example 1 derived from Douglas fir may be added to 10 pounds of dimethyl sulfoxide and a uniform solution formed by stirring. To this is added 20 pounds of a commercial sodium based concentrated sulfite waste liquor (approximately 50-55% sodium lignosulfonate solids basis) in 50% water solution. Moderate stirring will blend the ingredients into a pourable composition which will readily disperse in a paper mill white water system. The composition may be metered into the machine chest at an amount to provide a concentration level of 5 p.p.m. of the halogenated product to provide slimicide control which is superior to most commercially used slimicides used in like quantity.

*Example 4*

A paper-making, slime-organism-contaminated, ground wood slurry at 1% consistency was treated, in separate portions, with 200 p.p.m. substantially pure trichlorolevulinic (approximately 90% of the 3,3,5 isomer and 10% of the 3,5,5 isomer) and 200 p.p.m. of the concentrated product of Example 1 derived from Douglas fir by addition in freshly prepared 20% ethanol solution.

After 24 and 48 hours contact, respectively, between the pulp slurry and experimental biocide, at 20° C., two portions were pipetted out of each sample, plated in a nutrient agar, compared with untreated pulp of the same batch as to slime organism count. The pure trichlorolevulinic acid reduced the slime organism count by 93% while the concentrated, chlorinated crude levulinic acid product reduced the count by 100%.

What I claim is:

1. A process for preparing a biocidal composition having a broad spectrum of activity for controlling microorganisms comprising, hydrolyzing an hexose-yielding material by contacting said material with a water solution of an acid catalyst, separating the insoluble solids from the liquor thus formed, separating the catalyst from said liquor, stripping the readily volatile constituents from said liquor and removing a portion of the water from said liquor without removing a major portion of the high boiling soluble constituents, to isolate a concentrated product containing, predominately, levulinic acid and a minor amount of lactones and other low-volatile, soluble compounds, and halogenating said product with a halogen from the group consisting of bromine and chlorine to produce the biocidal composition.

2. A process for preparing a biocidal composition having a broad spectrum of activity for controlling microorganisms comprising, hydrolyzing a cellulosic material by contacting said material with a water solution of a volatile acid catalyst, separating the insoluble solids from the liquor thus formed, stripping the acid catalyst, formic acid and a major portion of the water from said liquor by vacuum distillation, to isolate a concentrated product containing, predominately, levulinic acid and a minor amount of lactones and other low-volatile, soluble compounds, and chlorinating said product to at least 22% by weight to produce the biocidal composition.

3. The process of claim 2 and wherein the concentrated product is chlorinated to between about 40% and 50% by weight.

4. The product produced by the process of claim 1.

5. The method of controlling microorganisms in a water system which comprises applying to the water system the product of claim 4 in an amount to provide a concentration level of at least around 0.5 part per million.

6. A method as in claim 2, wherein the vacuum distillation is continued until the liquor is concentrated to a product which boils in the range of about 240° to 250° C. at 760 mm. mercury pressure and wherein the concentrated product is chlorinated at a temperature of between about 100° C. and about 125° C.

References Cited by the Examiner

UNITED STATES PATENTS

| 2,305,738 | 12/1942 | Scheuing et al. | 260—528 |
| 2,382,572 | 8/1945 | Meyer | 260—528 |
| 2,738,367 | 3/1956 | Redmon | 260—528 |
| 2,780,588 | 2/1957 | Dunlop | 202—52 |
| 2,840,605 | 6/1958 | Leonard | 260—528 |
| 2,917,537 | 12/1959 | Haury | 260—483 |

JULIAN S. LEVITT, *Primary Examiner.*

GEORGE A. MENTIS, *Assistant Examiner.*